May 8, 1956  E. T. DAVIDSON ET AL  2,744,770
QUICKLY ATTACHABLE SAFETY HOSE COUPLING
Filed Oct. 3, 1951
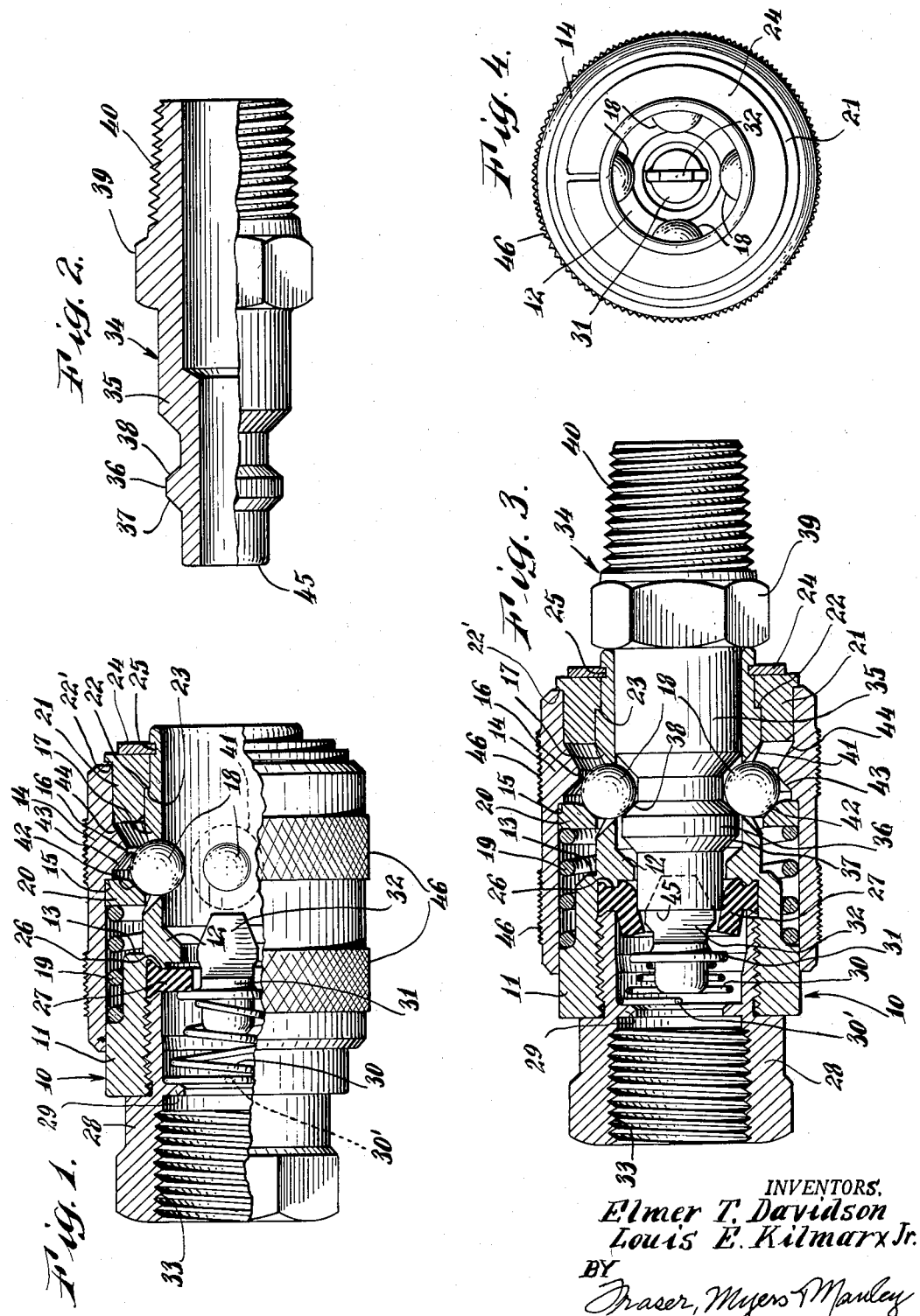
INVENTORS.
Elmer T. Davidson
Louis E. Kilmarx Jr.
BY
Fraser, Myers & Manley
ATTORNEYS.

United States Patent Office 2,744,770
Patented May 8, 1956

2,744,770

QUICKLY ATTACHABLE SAFETY HOSE COUPLING

Elmer T. Davidson and Louis E. Kilmarx, Jr., Brooklyn, N. Y., assignors to Scovill Manufacturing Company, Waterbury, Conn., a corporation of Connecticut Application October 3, 1951, Serial No. 249,484

4 Claims. (Cl. 285—169)

The present invention relates to hose couplings and the like of the quickly attachable and detachable type and aims to provide certain improvements therein. More particularly it relates to couplings of the type set forth having a male member and a female member which can be easily and quickly engaged and disengaged by a straight push or pull on a selected one of said members.

In all prior couplings of the type set forth known to us, the female coupling member comprises a locking sleeve which must be axially moved relatively to the male member to disengage said members. To facilitate such movement the sleeve had to be made of substantially larger diameter than the body of the female member to provide ample engagement of the sleeve. However, because of said enlarged diameter of the sleeve, the coupling was susceptible to accidental uncoupling through engagement of the sleeve by extraneous means, especially where a hose line containing the coupling was subject to being drawn across a floor where it might encounter an obstruction.

It is an object of our present invention to overcome the foregoing and other defects in couplings of the type set forth.

A further object of the invention is to provide a coupling of the type set forth which will be free of protuberances and have a smaller overall diameter than prior couplings intended for connecting hose members of corresponding size.

A still further object of the invention is to provide a coupling which has novel locking means which are entirely enclosed; which is of simple and economical construction; which may be readily assembled and disassembled; and which is highly efficient in use.

The foregoing and other objects of our invention not specifically enumerated we accomplish by providing a coupling; the female member of which comprises a spring-pressed, slidable sleeve which is not displaced during the act of coupling the male and female members together; which sleeve is of but slightly larger diameter than the body member and which sleeve must be manually moved axially relatively to the body of the female member to uncouple or disengage the coupling members. The invention and the advantages realized thereby will be readily understood by persons skilled in the art from the detailed description which follows, when considered in connection with the accompanying drawings showing a preferred illustrative embodiment, wherein:

Figure 1 shows a side elevational view of a female member or check unit of a coupling embodying our invention, parts being shown in section to better illustrate the construction.

Fig. 2 shows a side elevational view of a male member of the coupling embodying our invention, parts being shown in section to better illustrate the construction.

Fig. 3 shows a diametrical section through the coupling with the male and female members in coupled relation.

Fig. 4 shows an end elevational view of the female member of Fig. 1 when viewed from the right end thereof.

Referring to the drawings, the reference numeral 10 designates the female member or check unit as a whole, which consists of a tubular body member 11 having an open entrant end, an internal annular rib 12 spaced axially inwardly from said entrant end, an external annular groove 13, a slidable sleeve 14 having an internal, annular shoulder 15 and an internal, annular rib 16, the body portion 11 being formed with a plurality of circumferentially, equally spaced apertures 17 within which are movably held a plurality of balls 18, said balls being normally urged inwardy toward the axis of the body portion by a helical coil-spring 19 pressing against a washer 20, the spring 19 and washer 20 encircling the body member and being enclosed within the sleeve 14. Considered as part of the tubular body member, although separately formed therefrom, is a bushing 21 having an internal shoulder 22 bearing against an external shoulder 23 on the body member and an external shoulder 22' against which is adapted to bear one end of the sleeve 14, the said bushing being held in axial fixed relation on the body member by a split spring ring 24, one form of which is commercially known as a "Tru-Arc" ring, which is removably held in an annular groove 25 in the body member. The internal annular rib 12 is formed with a circumferential bead 26, upon which a packing washer 27 is held in place by a tubular washer holder 28 which threadedly engages within the body member 11. The washer holder 28 is formed intermediate its ends with an internal annular rib 29 adapted to serve as a bearing for a helical coil-spring 30, the last half coil 30' at one end of which extends diametrically of the spring, the opposite end of said spring engaging around a stud on a valve member 31 to hold it upon the packing washer 27. The valve member 31 may be of conventional form provided with a flattened, tapered deflator pin 32 adapted to be engaged by the male member (presently to be described) when the latter is inserted into the female member in establishing a fluid-tight coupling connection between said female and male coupling members. The washer holder 28 is internally threaded, as shown at 33, for engagement with a hose or the like.

The reference numeral 34 designates the male member of the coupling and consists of a tubular member 35 having adjacent one end which is insertible in the female member, an annular rib 36 having a tapered or camming surface 37 and a second tapered surface or shoulder 38. Adjacent its opposite end the tubular member 35 is provided with a polygonal wrench-engaging surface 39 and external threads 40 for engagement with a hose or the like.

Again referring to the female member 10, it will be seen that the spaced apertures 17 are of circular shape at the inner surface of the tubular body member and progressively increase in elliptical shape, as shown at 41 as they extend from the inner surface to the outer surface of said member, with the major axes of the elliptical portions of the apertures extending parallel to the axis of the body member, for a purpose which will presently appear. Also, the circular portion of each aperture is of smaller diameter than the balls 18 whereby said balls are prevented from moving inwardly through the apertures 17 although adapted to be held with a substantial portion of the balls projecting inwardly beyond the inner surface of the tubular body member. The balls 18 are held in their innermost position relative to the axis of the body member by the washer 20 when it is held in engagement with the shoulder 15 by the spring 19, the washer being formed with a camming surface 42 which normally presses upon the balls 18 to urge them inwardly within the apertures. The washer 20 is also responsive to yield and move axially of the body member to permit the balls to move outwardly when outward pressure is applied thereagainst by the tapered camming surface 37 when the male member is inserted into the female member. The annular rib 16 has oppositely inclined faces 43 and 44 which are adapted to guide and permit movement of the balls inwardly and outwardly, respectively, during the course of coupling and uncoupling the male and female members, as will presently appear.

The coupling in use will have the respective male and female members connected to a fixed or flexible conduit (not shown) through which it is desired to control the passage of fluid. Normally the female member when uncoupled to the male member will have its parts in the relative positions shown in Fig. 1, that is to say, the valve 31 will be seated upon the washer 27 thus closing off the fluid supply line which will be connected at 33 and the balls 18 will be held in their innermost positions within the apertures 17 by the spring pressure upon the washer 20, which spring pressure will also hold the slidable sleeve 14 in proximity to its limiting position against the shoulder 22'.

To couple the members together, the male member 34 is pushed into the bore of the female member 10, in the course of which action the camming surface 37 will exert an outward pressure upon the balls 18, which pressure, upon being transmitted to the washer 20, will move it axially against the force of the spring 19 and permit the balls to move outwardly and axially in the elliptical portions 41 of the apertures 17 and into the space between the washer 20 and the face 43 on rib 16. When the entered end 45 has engaged the packing washer 27 and has moved the deflator 32 to unseat the valve 31, the rib 36 will have cleared the balls and the force of the spring will return the balls behind the shoulder 38 to lock the male member in leak-tight coupled relation to the female member. In the course of said coupling operation, the slidable sleeve may move axially of the body member into abutting engagement with the shoulder 22'. Furthermore, the extent to which the valve is unseated will be limited by the diametrically-extending portion 30' of spring 30.

To uncouple the members it is merely necessary to manually move the sleeve 14 to the left from its position shown in Fig. 3, and to facilitate such movement the exterior of the sleeve is knurled, as shown at 46. As the sleeve is moved to the left it forces the washer 20 to the left thus releasing the pressure on the balls 18, whereupon the male member can be withdrawn from the female member since the balls may be moved outwardly free of spring pressure into the recess provided between the face 44 and the inner end of the bushing 21 as axial pressure is applied to the balls by the shoulder 38 on the male member. By virtue of the pressure of the spring 30 on the valve 31, said valve, in moving onto its seat upon release of the holding force by the balls on the male member, will assist in forcing the male member out of the female member. Immediately after such disconnection of the coupling members and the release of the manual force on the sleeve 14, the parts of the female coupling member will return to their normal position, as shown in Fig. 1.

Should anything happen to the female member to interfere with its proper functioning, the split ring 25 may be readily removed and the internal parts of the female member examined to ascertain and correct any defect which may be found to be present therein.

From the foregoing detailed description it will be apparent that we have provided a coupling of the type described which accomplishes all the objects set forth in the opening statement of the specification, and while we have shown and described but a single embodiment of our invention, it is to be understood that we do not wish to be limited to the details of construction disclosed since these may be varied within the range of mechanical and engineering skill without departing from the spirit of the invention as claimed.

What we claim is:

1. A female member for a quickly attachable and detachable hose coupling or the like, comprising a tubular body having an entrant end, and external annular groove, a plurality of circumferentially spaced apertures leading from said groove to the inner surface of the tubular body, a locking ball in each aperture, a sleeve slidable on said body and overlying said external groove, said sleeve having an internal rib engaging in the annular groove and an internal shoulder, the body member having an internal shoulder at one end of the annular groove facing the shoulder on the sleeve and an external shoulder adjacent the entrant end, a floating washer having a camming surface disposed in the annular groove, a helical spring disposed in the annular groove and bearing at one end against the internal shoulder on the body and at its other end against the washer to bias the camming surface thereof into engagement with the balls to urge them inwardly in the apertures toward the axis of the body and through said washer engaging the shoulder on the sleeve to bias the sleeve to maintain it in its axial limiting position in proximity to the external shoulder at the entrant end of the body, the internal rib on the sleeve overlying the side of the balls facing the entrant end of the body and having an inner diameter to hold the balls in locking position when the sleeve is at its aforementioned limiting position against a force acting on the balls diagonally outwardly and toward the entrant end of the body, the side of the rib facing away from the body entrant end and the corresponding sides of the apertures being spaced to permit the balls to move outwardly by said rib and move said washer away from said rib against the action of said spring when a force acting diagonally outwardly and away from the body entrant end is applied to said balls, movement of the sleeve away from its limiting position moving said rib from over the balls to provide a clearance for the radial outward movement of the balls into the annular groove when an axial force is applied to the balls in a direction toward the entrant end of the body.

2. In a quickly attachable and detachable hose coupling or the like, in combination, a female member comprising a tubular body having an entrant end and an external annular groove, a plurality of circumferentially spaced apertures leading from said groove to the inner surface of the tubular body, a locking ball in each aperture, a sleeve slidable on said body and overlying said external groove, a shoulder on said sleeve, a shoulder on said body, a helical spring and a washer circumferentially disposed around said body between the aforementioned shoulders on said body and said sleeve with said spring normally exerting a force on said washer biasing said washer against said balls and against the shoulder on said sleeve urging the balls inwardly in the apertures toward the axis of the body and urging the sleeve to maintain it in proximity to its axial limiting position toward the entrant end of the body; and a male member having thereon a camming surface for engaging and moving the balls outwardly against the force of the helical spring-pressed washer and also having thereon an annular shoulder behind which the balls engage to hold the female member and the male member in assembled relation when the male member is inserted into the female member, during which action the position of the sleeve is not substantially disturbed, and an internal means on said sleeve cooperating with said balls and apertures to permit insertion of said male member but to prevent withdrawal thereof when said sleeve is in its spring-urged position, movement of the sleeve in opposition to the pressure of the helical spring operating to release the spring force on the balls whereby to permit the male member to be withdrawn from the female member.

3. In a quickly attachable and detachable hose coupling or the like, in combination, a female member comprising a tubular body having an entrant end, a plurality of circumferentially spaced apertures leading from the outer to the inner surface of the tubular body, a locking element in each aperture, a sleeve slidable on said body, a shoulder on said sleeve, a shoulder on said body, a helical spring and a washer circumferentially disposed around said body between the aforementioned shoulders on said body and said sleeve with said spring normally exerting a force on said washer biasing said washer against said locking elements and against the shoulder on said sleeve urging the locking elements inwardly in the apertures toward the axis of the body and urging the sleeve to maintain it in proximity to its axial limiting position toward the entrant end of the body, and a male member having thereon a camming surface for engaging and moving the locking elements outwardly against the force of the helical spring-pressed washer and also having thereon an annular shoulder behind which the locking elements engage to hold the female member and the male member in assembled relation when the male member is inserted into the female member, during which action the position of the sleeve is not substantially disturbed, and an internal means on said sleeve cooperating with said locking elements and apertures to permit insertion of said male member but to prevent withdrawl thereof when said sleeve is in its spring-urged position, movement of the sleeve in opposition to the pressure of the helical spring operating to release the spring force on the locking elements whereby to permit the male member to be withdrawn from the female member.

4. In a quickly attachable and detachable hose coupling or the like, in combination, a female member comprising a tubular body have an entrant end, a plurality of circumferentially spaced apertures leading from the outer to the inner surface of the tubular body, a locking element in each aperture, a sleeve slidable on said body, a shoulder on said sleeve, a shoulder on said body, a helical spring and a washer circumferentially disposed around said body between the aforementioned shoulders on said body and said sleeve with said spring normally exerting a force on said washer biasing said washer against said locking elements and against the shoulder on said sleeve urging the locking elements inwardly in the apertures toward the axis of the body and urging the sleeve to maintain it in proximity to its axial limiting position toward the entrant end of the body, and an internal means on said sleeve cooperating with said locking elements and apertures to permit said locking elements to move outwardly against the action of said spring when a force is applied to the inner side of the locking elements on the entrant side of the body but to prevent such outward movement when a force is applied to the inner side of the locking elements away from the entrant side of the body, said internal means being movable with said sleeve against the action of said spring out of cooperative relation with said locking elements to permit free outward movement of said locking elements.

References Cited in the file of this patent
UNITED STATES PATENTS

| | | |
|---|---|---|
| 2,069,434 | Eastman | Feb. 2, 1937 |
| 2,092,116 | Hansen | Sept. 7, 1937 |
| 2,521,701 | Earle | Sept. 12, 1950 |
| 2,536,702 | Scheiwer | Jan. 2, 1951 |
| 2,631,185 | Earle | Mar. 10, 1953 |